United States Patent
Hutchinson et al.

(10) Patent No.: US 7,624,750 B2
(45) Date of Patent: Dec. 1, 2009

(54) FLAPPER VALVE WITH MOLD-IN-PLACE BEARINGS

(75) Inventors: Robert Michael Hutchinson, Moneta, VA (US); Pradeep John Pinto, Chicago, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 504 days.

(21) Appl. No.: 11/381,697

(22) Filed: May 4, 2006

(65) Prior Publication Data

US 2006/0278268 A1 Dec. 14, 2006

Related U.S. Application Data

(60) Provisional application No. 60/689,858, filed on Jun. 13, 2005.

(51) Int. Cl.
*F16K 1/22* (2006.01)
(52) U.S. Cl. .................. 137/15.25; 251/305; 29/890.12
(58) Field of Classification Search .............. 137/15.25, 137/15.24, 15.18; 251/305, 308; 29/890.12, 29/890.26, 890.27, 890.126, 890.127
See application file for complete search history.

(56) References Cited

U.S. PATENT DOCUMENTS

| | | | |
|---|---|---|---|
| 4,158,352 A | 6/1979 | Blatter | |
| 4,771,740 A | 9/1988 | Koike | |
| 4,836,499 A * | 6/1989 | Steele et al. | ................. 251/173 |
| 4,856,558 A | 8/1989 | Kardos | |
| 5,715,782 A | 2/1998 | Elder | |
| 6,235,231 B1 | 5/2001 | Martin | |
| 6,612,325 B2 | 9/2003 | Rentschler et al. | |
| 6,626,421 B2 | 9/2003 | Torii et al. | |
| 6,626,422 B2 | 9/2003 | Kaiser | |
| 6,698,717 B1 | 3/2004 | Brookshire et al. | |
| 6,837,261 B2 * | 1/2005 | Rentschler et al. | ..... 137/315.22 |
| 6,877,723 B2 | 4/2005 | Martinsson et al. | |
| 6,901,942 B2 * | 6/2005 | Krimmer et al. | ......... 137/15.25 |

* cited by examiner

*Primary Examiner*—Kevin L Lee
(74) *Attorney, Agent, or Firm*—Renner, Otto, Boisselle & Sklar, LLP

(57) ABSTRACT

A flapper valve and a method of making the same that does not require bearing assembly. More particularly, the flapper valve includes a shaft having one or more flap portions and one or more bearing portions molded in place on the shaft as a unitary structure. The bearing portions are separated from adjacent flap portions and/or the shaft thereby forming a bearing that rotates independently of flap portions on the shaft. Accordingly, the flapper valve with mold-in-place bearings does not require bearings to be separately assembled or installed prior to installation of the valve.

16 Claims, 3 Drawing Sheets

FLAPPER VALVE WITH MOLD-IN-PLACE BEARINGS

RELATED APPLICATIONS

This application hereby incorporates by reference and claims the benefit of U.S. Provisional Application No. 60/689,858 filed Jun. 13, 2005.

FIELD OF THE INVENTION

The present invention relates generally to a flapper valve. More particularly, the invention relates to a flapper valve for controlling airflow in an intake system of an internal combustion engine.

BACKGROUND OF THE INVENTION

It is possible to improve the performance and efficiency of an internal combustion engine by regulating the flow of air into a combustion chamber. One way in which to maintain a more uniform flow of air is to provide a valve in the intake of the engine to throttle air flow. Such valves, commonly referred to as flapper valves or butterfly valves, are generally constructed from a metal shaft to which metal flaps are welded or riveted for rotation with the shaft. An alternative construction is a shaft and flaps made of a continuous piece of plastic. In either type of valve construction, bearings are required for rotationally supporting the shaft. Typical bearings, in particular bushings, used for supporting flapper valves are either a split two-piece type bearing installed after the valve is constructed, or a single piece bearing that is slipped onto the shaft prior to attaching the flaps to the shaft. Such designs thus require several steps to assemble and/or install in an intake and therefore involve increased labor cost.

SUMMARY OF THE INVENTION

The present invention provides a flapper valve and a method of making the same that does not require assembly of bearings on the shaft. More particularly, the flapper valve is formed from a unitary molded structure including one or more flap portions and one or more bearing portions molded over a shaft. The bearing portions are separated from adjacent flap portions so that the shaft and the flap portions can rotate relative to the bearings. Accordingly, the flapper valve with mold-in-place bearings does not require bearings to be separately assembled or installed on the shaft prior to installation of the valve.

In accordance with an aspect of the present invention, a method of making a flapper valve assembly comprises molding at least one flap and at least one bearing portion as a unitary structure on a shaft, and separating the at least one bearing portion from the at least one flap, such as by cutting, to form a bearing that can rotate independently of the flap portions on the shaft. The flap portions can be secured against rotation relative to the shaft. For example, the flap portions can be molded onto a non-circular portion of the shaft. A rubber overmolding can be provided on the flap portions to facilitate sealing of the flap portions against a surface, such as an intake manifold.

In accordance with another aspect of the invention, a flapper valve for an intake manifold of an internal combustion engine comprises a shaft, at least one flap molded to the shaft and fixed against rotation, and at least one bearing for supporting the shaft for rotation. The bearing is a molded bearing separated from the at least one flapper valve and the shaft. The bearing generally defines a continuous annular single piece that completely surrounds the shaft.

Further features of the invention will become apparent from the following detailed description when considered in conjunction with the drawings.

DETAILED DESCRIPTION

Figure 1:
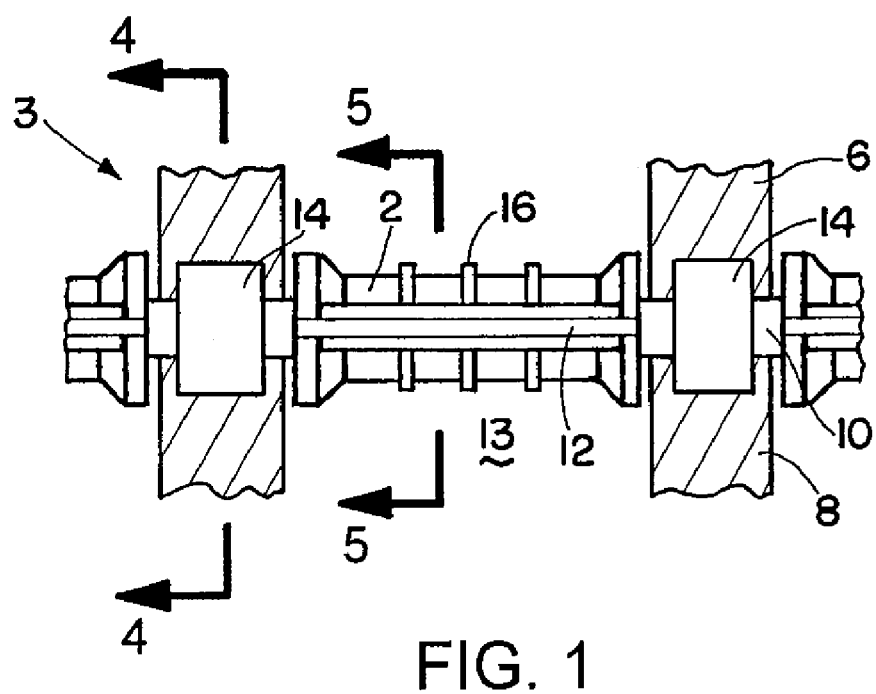
FIG. 1 is a partial cross-sectional view of an exemplary flapper valve in accordance with the present invention, shown installed in a manifold assembly.

Referring now to the drawings in detail, and initially to FIG. 1, an exemplary flapper valve 2 in accordance with the present invention is shown in a manifold assembly, generally indicated by reference numeral 3. The manifold assembly 3 generally includes an upper housing portion 6 mated with a lower housing portion 8. The flapper valve 2 generally comprises a shaft 10 and one or more flap portions 12 spaced apart along the length of, and rotatable with, the shaft 10. One or more bearings 14, retained between the upper housing portion 6 and lower housing portion 8 in FIG. 1, support the shaft 10 for rotation within the manifold assembly 4. An actuator (not shown) is typically provided at an end of the shaft 10 for rotating the shaft 10 so that the flap portions 12 can regulate the flow of air through passageways 13 of the manifold assembly 3.

The flap portions 12 can be any suitable shape, typically corresponding to the cross-sectional shape of the passageways 13. The illustrated flap portions 12 have a generally rectangular shape with rounded corners. A plurality of reenforcing ribs 16 are provided for enhancing the structural rigidity of each flap portion 12.

Figures 2, 3:
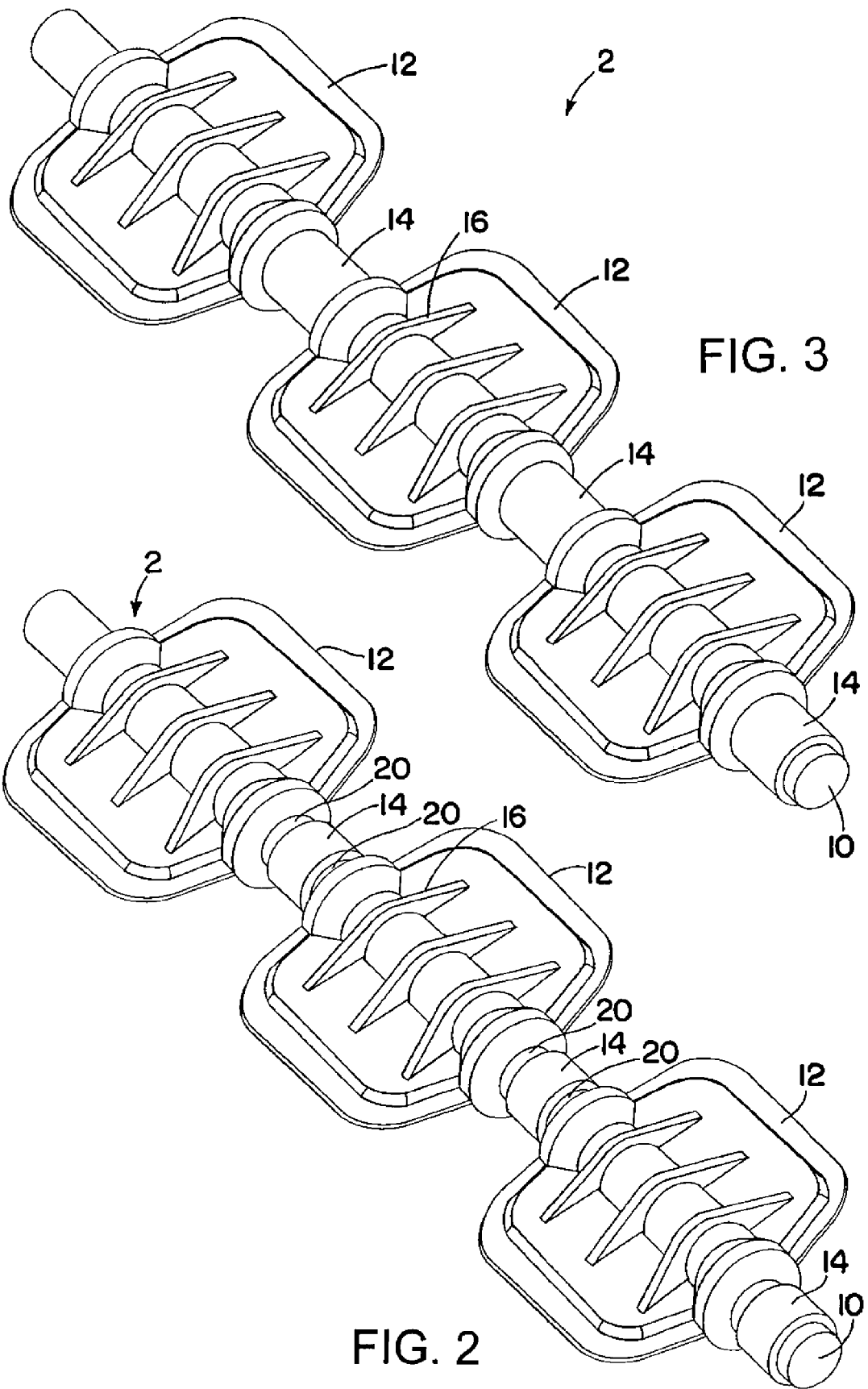
FIG. 2 is a perspective view of the flapper valve of FIG. 1.
FIG. 3 a perspective view of a flapper valve prior to separation of the bearing portions from the flap portions in accordance with an embodiment of the invention.

The flapper valve 2 in FIGS. 1 and 2 is formed by first molding the flap portions 12 and the bearing portions 14 to the shaft 10 as a unitary structure, preferably of plastic. Such unitary structure is shown in FIG. 3. As shown, the bearing portions 14 are integrally joined to the flap portions 12. Any suitable molding process can be used for molding the unitary structure, such as an injection molding process. The bearing portions 14 are then separated from the adjacent flap portions 12 in a second separating operation thereby resulting in the flapper valve of FIGS. 1 and 2. Any suitable method of separating the bearing portions 14 can be used, such as machining a groove with a blade.

Figure 4:
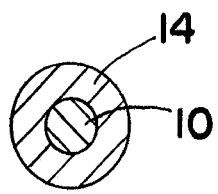
FIG. 4 is a cross-sectional view through a flap portion of the flapper valve of FIG. 1, taken along the line 4-4 in FIG. 1.
Figure 5:
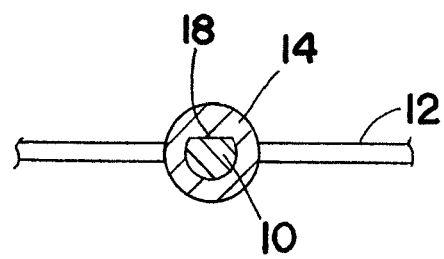
FIG. 5 is a cross-sectional view through a bearing portion of the flapper valve of FIG. 1, taken along the line 5-5 in FIG. 1.

Turning to FIG. 4, the portions of the shaft 10 over which the bearing portions 14 are molded are generally smooth and circular such that the bearing portions 14 can rotate independently of the shaft 10 after the bearing portions 14 are separated from the flap portions. In contrast, and as shown in FIG. 5, the flap portions 12 are secured to the shaft 10 for rotation therewith by projections and/or recesses on the outer diameter of the shaft 10. As illustrates, the shaft 10 includes a non-circular portion, flat 18, that forms a mechanical interlock between the flap portion 12 and the shaft 10. As an alternative, an outer diameter of the shaft 10 can be knurled to provide projections and/or recesses to secure the flap portions 12 for rotation with the shaft 10.

Returning to FIG. 2, it will be appreciated that a portion of the molded material has been removed leaving a gap 20 between each bearing portion 14 and the adjacent flap portion 12. Accordingly, the bearing portions 14 are free to move axially along the shaft 10 between adjacent flap portions 12. By removing this portion of the molded material, the flapper valve 2 can be mounted in a manifold with an amount of axial play in the shaft 10 to permit the flap portions 12 to be aligned with the passageways that they will be configured to open and close. This can be advantageous, for example, in applications with large dimensional tolerances and for accommodating differing rates of thermal expansion of the shaft 10 and the molded material.

Figure 6:
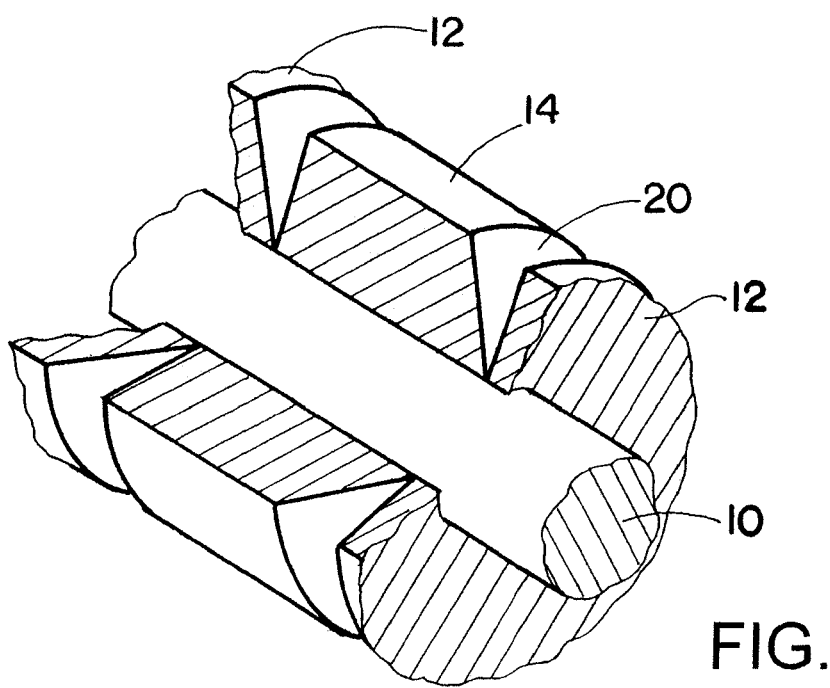
FIG. 6 is an enlarged partial cross-sectional view of a flapper valve wherein the bearing has been separated from adjacent flap portions by die cutting.

In FIG. 6, a bearing portion has been separated from the adjacent flap portions 12 by a die-cutting operation. Accordingly, a tapered knife or similar cutting device has been used to separate the bearing portions 14 from the flap portions 12 thereby forming a V-shape gap 20. Such a cutting device can include semicircular knife members (dies) mounted in a press that is configured to compressively engage the molded material to separate the bearing portions 14 from the flap portions 12. The V-shape gap 20 results in a bearing portion 14 whose radially outer axial length dimension is smaller then its radially inner axial length dimension. As such, the bearing portion 14 generally is fixed axially between adjacent flap portions 12 and, thus, when mounted the flapper valve 2 will have reduced or no axial play as compared to the embodiment shown and described in connection with FIGS. 1-5.

By forming the flap portions 12 and bearing portions 14 as a unitary structure on the shaft 10, and subsequently separating the bearing portions 14 from the flap portions 12 in a separating operation, the flapper valve 2 is formed without having to separately install or assemble bearings and/or flap portions on the shaft 10.

The flapper valve 2 of the present invention can include a rubber overmolding layer on the flap portions 12 and/or the bearings portions 14. The rubber overmolding layer can be applied to the flap portions 12 and/or bearing portions 14 before or after the bearing portions 14 are separated, and can facilitate a tight seal between the flap portions 12 and ports or passageways of a manifold when the flapper valve 2 is installed.

It will be appreciated that the bearings portions 14 as described above are free to rotate independently of the shaft 10 after separation from the flap portions 12. In some instances, residual interlocking forces between the bearing portions 14 and shaft 10 will prevent free rotation of the bearing portions 14. Accordingly, the bearing portions 14 may need to be initially rotated relative to the shaft 10 to overcome any residual interlocking forces to permit free rotation of the bearing portions 14.

The bearing portions 14 can be made of any suitable material, such as Delrin® manufactured by Dupont. Materials such as Delrin® that are lightweight, durable, low wear, and low friction are ideal for use as a bearing material in accordance with the present invention.

Although the invention has been shown and described in the context of an intake manifold for an engine, it will be appreciated that aspects of the invention can be used in a wide variety of applications. For example, the invention can be used in connection with a vehicle HVAC system for controlling the flow of air to various areas of a passenger compartment of the vehicle and/or the flow of air to heat exchangers for heating and cooling purposes.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of making a flapper valve assembly comprising:
   molding at least one flap and at least one bearing portion as a unitary structure on a shaft; and
   separating the at least one bearing portion from the at least one flap so that the bearing portion can rotate independently of the flap on the shaft.

2. A method as set forth in claim 1, wherein the separating includes cutting.

3. A method as set forth in claim 1, wherein the molding includes injection molding.

4. A method as set forth in claim 1, wherein the flap is secured against rotation relative to the shaft.

5. A method as set forth in claim 4, wherein the securing includes molding the at least one flap onto a non-circular portion of the shaft, whereby the flap is secured against rotation relative to the shaft.

6. A method as set forth in claim 1, wherein the shaft is a metallic shaft.

7. A method as set forth in claim 1, further comprising overmolding the at least one flap portion with a rubber material.

8. A method as set forth in claim 1, wherein the molding includes molding a plurality of flap portions.

9. A flapper valve made by the method of claim 1.

10. A manifold including the flapper valve made by the method of claim 1.

11. A flapper valve for an intake manifold of an internal combustion engine comprising:
    a shaft;
    at least one flap molded to the shaft and fixed against rotation; and
    at least one bearing molded to the shaft for supporting the shaft for rotation;
    wherein the bearing is an annular piece separated from a unitary structure molded to the shaft including the flap, the bearing being separated from the at least one flap and the shaft.

12. A flapper valve as set forth in claim 11, wherein the bearing is a continuous annular single piece.

13. A flapper valve as set forth in claim 11, wherein the bearing includes a unitary body that completely surrounds the shaft.

14. A flapper valve as set forth in claim 11, wherein the bearing is made of nylon.

15. A manifold including the flapper valve as set forth in claim 11.

16. A flapper valve as set forth in claim 11, wherein the shaft has at least one flat spaced from ends thereof, and the flap surrounds the flat.

* * * * *